(12) United States Patent
Tyndall et al.

(10) Patent No.: US 8,121,754 B2
(45) Date of Patent: Feb. 21, 2012

(54) INDUCTIVE COUPLING OF PULSES FROM PIEZOELECTRIC DEVICE

(75) Inventors: Patrick A. Tyndall, Simpsonville, SC (US); Frank E. Gramling, Simpsonville, SC (US)

(73) Assignee: Michelin Recherche Et Technique, Granges-Paccot (CH)

( * ) Notice: Subject to any disclaimer, the term of this patent is extended or adjusted under 35 U.S.C. 154(b) by 734 days.

(21) Appl. No.: 11/916,486

(22) PCT Filed: Jun. 10, 2005

(86) PCT No.: PCT/US2005/020987
§ 371 (c)(1),
(2), (4) Date: Dec. 9, 2008

(87) PCT Pub. No.: WO2006/135370
PCT Pub. Date: Dec. 21, 2006

(65) Prior Publication Data
US 2009/0134710 A1    May 28, 2009

(51) Int. Cl.
*G06F 7/00* (2006.01)
(52) U.S. Cl. .......................................... 701/36; 73/146.5
(58) Field of Classification Search .................... 701/29, 701/36; 73/146, 146.5, 629
See application file for complete search history.

(56) References Cited

U.S. PATENT DOCUMENTS

| | | |
|---|---|---|
| 3,760,351 A | 9/1973 | Thomas |
| 4,061,200 A | 12/1977 | Thompson |
| 4,510,484 A | 4/1985 | Snyder |
| 4,862,486 A | 8/1989 | Wing et al. |
| 5,196,845 A | 3/1993 | Myatt |
| 5,457,447 A | 10/1995 | Ghaem et al. |
| 5,479,984 A | 1/1996 | Easterbrook et al. |
| 5,741,966 A | 4/1998 | Handfield et al. |
| 5,749,984 A | 5/1998 | Frey et al. |
| 5,844,516 A | 12/1998 | Viljanen |
| 5,869,189 A | 2/1999 | Hagood, IV et al. |
| 6,048,622 A | 4/2000 | Hagood, IV et al. |
| 6,175,302 B1 | 1/2001 | Huang |
| 6,438,193 B1 | 8/2002 | Ko et al. |
| 6,739,195 B2 | 5/2004 | Evans et al. |
| 6,807,853 B2 | 10/2004 | Adamson et al. |
| 6,978,668 B2 * | 12/2005 | Starinshak ...................... 73/146 |
| 6,978,669 B2 * | 12/2005 | Lionetti et al. ............... 73/146.4 |

(Continued)

FOREIGN PATENT DOCUMENTS
DE      195 22 269 A1     1/1997
(Continued)

OTHER PUBLICATIONS

Supplementary European Search Report for European Patent Application No. 05760852.3-2425.

(Continued)

*Primary Examiner* — Hanh V Tran
(74) *Attorney, Agent, or Firm* — Dority & Manning, P.A.

(57) ABSTRACT

Apparatus and methodology for inductively coupling tire rotations related signals to a tire electronics module associated with a tire are provided. The tire electronics module is configured to receive the tire rotation related signals through inductive transmission from a signal transmission module that includes at least a piezoelectric element and a transmitter inductor. The signal transmitter module and the tire electronics module may be physically separated from each other and may be separately or collectively encased in a protective coating.

17 Claims, 2 Drawing Sheets

U.S. PATENT DOCUMENTS

| | | | |
|---|---|---|---|
| 7,138,911 B2 * | 11/2006 | Tyndall | 73/146.5 |
| 7,183,937 B2 * | 2/2007 | Park et al. | 73/146 |
| 7,331,367 B2 * | 2/2008 | Koch et al. | 340/442 |
| 7,343,787 B2 * | 3/2008 | Oflaz | 73/146 |
| 2004/0078662 A1 | 4/2004 | Hamel et al. | |

FOREIGN PATENT DOCUMENTS

| | | |
|---|---|---|
| EP | 0 450 653 A2 | 10/1991 |
| JP | 01-265166 | 10/1989 |
| JP | 04-212611 | 8/1992 |
| JP | 09-188113 | 7/1997 |
| JP | 2001-346783 | 12/2001 |
| JP | 2001-525283 | 12/2001 |
| JP | 2002-544745 | 12/2002 |
| JP | 2004-326158 | 11/2004 |
| WO | WO 99/29524 | 6/1999 |
| WO | WO 00/70569 | 2/2000 |

OTHER PUBLICATIONS

International Search Report and Written Opinion, Nov. 15, 2005.

* cited by examiner

INDUCTIVE COUPLING OF PULSES FROM PIEZOELECTRIC DEVICE

FIELD OF THE INVENTION

The present technology relates to the field of tire electronics devices and the supplying of signals to such devices. More particularly, the present technology relates to inductively transmitting data to such devices from a piezoelectric device.

BACKGROUND OF THE INVENTION

The incorporation of electronic devices with pneumatic tire structures yields many practical advantages. Tire electronics may include sensors and other components for obtaining information regarding various physical parameters of a tire, such as temperature, pressure, number of tire revolutions, vehicle speed, number of rotations at speed, temperature at speed and other physical and operational parameters as well as manufacturing information such as name of manufacturer, manufacturing location, date of manufacture, etc. Such performance information may become useful in tire monitoring and warning systems, and may even potentially be employed with feedback systems to regulate proper tire pressure levels. For example, differences in tire rotational speed on the same vehicle may be indicative of under or over inflation as the diameter of a tire will change slightly with inflation pressure.

U.S. Pat. No. 5,749,984 (Frey et al.) discloses a tire monitoring system and method that is capable of determining such information as tire deflection, tire speed, and number of tire revolutions. Another example of a tire electronics system can be found in U.S. Pat. No. 4,510,484 (Snyder), which concerns an abnormal tire condition warning system. U.S. Pat. No. 4,862,486 (Wing et al.) also relates to tire electronics, and more particularly discloses an exemplary revolution counter for use in conjunction with automotive and truck tires.

Yet another potential capability offered by electronics systems integrated with tire structures corresponds to asset tracking and performance characterization for commercial vehicular applications. Commercial truck fleets, aviation crafts and earthmover/mining vehicles are all viable industries that could utilize the benefits of tire electronic systems and related information transmission. Tire sensors can determine the distance each tire in a vehicle has traveled and thus aid in maintenance planning for such commercial systems. Vehicle location and performance can be optimized for more expensive applications such as those concerning earth-mining equipment. Entire fleets of vehicles could be tracked using RF tag transmission, exemplary aspects of which are disclosed in U.S. Pat. No. 5,457,447 (Ghaem et al.).

Such integrated tire electronics systems have conventionally been powered by a variety of techniques and different power generation systems. Examples of mechanical features for generating energy from tire movement are disclosed in U.S. Pat. Nos. 4,061,200 (Thompson) and 3,760,351 (Thomas). Such examples provide bulky complex systems that are generally not preferred for incorporation with modern tire applications. Yet another option for powering tire electronics systems is disclosed in U.S. Pat. No. 4,510,484 (Snyder), which concerns a piezoelectric reed power supply symmetrically configured about a radiating centerline of a tire.

Another typical solution for powering tire electronics systems corresponds to the use of a non-rechargeable battery, which inherently provides an inconvenience to the tire user since proper electronics system operation is dependent on periodic battery replacement. Conventional batteries also often contain heavy metals that are not environmentally friendly and which present disposal concerns, especially when employed in significant quantities. Still further, batteries tend to deplete their energy storage quite rapidly when powering electronic applications characterized by complex levels of functionality. Battery storage depletion is especially prevalent in electronic systems that transmit information over a relatively far distance such as from truck wheel locations to a receiver in the truck cabin. Even when batteries are used in electronics systems that transmit from wheel locations to a closer receiver location, information is then typically relayed via hard-wire transmission medium from the RF receiver location to the vehicle cab thus requiring the installation of additional and often-expensive communications hardware in a vehicle.

Yet another known method for deriving power for tire monitoring systems relates to scavenging RF beam power with an interrogation antenna in close proximity to a tire and integrated electronic features. Energy that is radiated from the antenna is scavenged to power the electronics, which must often be very specialized ultra-low-power electronics limited to within a few microwatts. Interrogation antennas employed in conjunction with beam-powered electronics must typically be placed in relatively close proximity (within about two feet) to each wheel well due to limited transmission ranges. This typically requires multiple interrogation antennas per vehicle, thus adding to potential equipment costs. Each antenna is also quite susceptible to damage from road hazards, and thus for many reasons may not be the most desirable solution for powering certain tire electronic applications.

In accordance with the present subject matter, it is appreciated that certain advantages of piezoelectric materials have long been recognized. However, such technology is constantly improving, thus potentially affording applications that utilize piezoelectric materials with improved operating capabilities. Examples of relatively new advances in piezoelectric technology are provided in U.S. Pat. Nos. 5,869,189 (Hagood, IV et al.) and 6,048,622 (Hagood, IV et al.), directed to composites for structural control. The presently disclosed technology concerns further advances in piezoelectric technology such that data transmission may be combined with an optional power conversion arrangement and together can be integrated with a tire or wheel assembly.

The disclosures of all of the foregoing United States patents are hereby fully incorporated into this application for all purposes by reference thereto. While various configurations involving piezoelectric devices have been developed for use with tire electronic systems, and while various combinations of information have been wirelessly relayed from a tire or wheel assembly using conventional technologies, no design has emerged that generally encompasses all of the desired characteristics as hereafter presented in accordance with the subject technology.

SUMMARY OF THE INVENTION

In view of the recognized features encountered in the prior art and addressed by the present subject matter, an improved system and methodology for signal transmission employing piezoelectric devices integrated within a tire structure has been developed.

In accordance with more particular aspects of the disclosed technology, one aspect of the present subject matter is to provide a pneumatic tire with integrated electronic components including a piezoelectric device. It should be borne in mind that the term integrated as used herein is meant to include any and all modalities wherein a component may be associated with a tire or wheel structure. Non-limiting examples include securing a component on an inside or outside surface of a tire or wheel structure or actually embedding a component within a tire or wheel structure. One exemplary electronic application concerns a tire monitoring system designed to measure and transmit information regarding tire rotation, but is should be noted that other tire conditions such as pressure and temperature, as well as, other information such as general tire identification variables, and/or various combinations of such information may also be transmitted. Such electronic components optionally may be powered by energy harvested from the integrated piezoelectric device, and may correspond to numerous electronic applications.

Various features and aspects of the subject tire electronics system and specialized data transmission methodology offer a plurality of advantages. The disclosed technology provides for a tire rotation detection system that is not dependent on the direct connection of a rotation sensitive device to tire electronics components. In addition, although batteries and battery-operated devices may be incorporated with aspects of the present subject matter, many complications regarding tire electronics that are solely powered by batteries may be obviated in accordance with optional features of the disclosed technology through the employment of the tire rotation sensitive piezoelectric device as a source of operating potential for the tire electronics.

Another advantage of the present subject matter is that a tire monitoring system is provided that improves the operational reliability of the system by reducing adverse effects resulting for the high vibration environment of a tire. For example, no direct-wired connection from the tire rotation sensor to the tire electronics is required.

Yet another advantage of optional features the present subject matter is that there are fewer limitations regarding the type and amount of electronic equipment capable of utilization within tire and wheel assembly structures. Tire electronics powered by conventional methods are often limited to ultra-low power devices. Devices in accordance with the disclosed technology are not necessarily subject to such extreme power limitations. This advantage further facilitates greater functionality of tire electronics, as more components and/or higher-level equipment may potentially be utilized.

A still further advantage of the present subject matter is that the disclosed system and method for sensing tire rotation and rotation related parameters may be used in accordance with a variety of existing applications. Measurement capabilities, monitoring and warning systems, vehicle feedback systems, and asset tracking potential may be possible for applications such as commercial truck fleets, airplanes, and mining/earthmover equipment.

In one exemplary embodiment of the present subject matter, a pneumatic tire assembly with integrated electronic components comprises a tire structure, an active piezoelectric element, a conditioning module, a transmitting module, and an electronics package. More preferably, the tire structure is characterized by a crown having an exterior tread portion for making contact with a ground surface, bead portions for seating the tire to a wheel rim, exterior sidewall portions extending between each bead portion and the crown, and an inner liner along interior crown and sidewall surfaces. The conditioning module and transmitting module are electrically coupled to the piezoelectric element to receive electric impulses generated within the piezoelectric element and generate a tire rotation related signal output. This output is then applied to a transmission device to transfer tire rotation related signals to selected components in the electronics package. The piezoelectric element, conditioning module and transmitting module may be adhered to the interior crown surface of the tire or the piezoelectric element, conditioning module and transmitting module could be cured directly into the tire's architecture.

A still further exemplary embodiment of the disclosed technology corresponds to a methodology for generating tire rotation related signals from piezoelectric elements integrated within a wheel assembly. A first step in such a method involves providing an active piezoelectric element for incorporation within a selected interior location of the wheel assembly. A next step in the method for generating tire rotation related signals corresponds to subjecting the wheel assembly to mechanical strain generally occurring as the wheel assembly rotates along a ground surface resulting in flexure of portions of the wheel assembly and generation of electric current within the provided piezoelectric element. This generated electric current is then conditioned and applied to an inductive device to transmit tire rotation related signals to the electronic devices associated with the wheel assembly.

Additional aspects and advantages of the present subject matter are set forth herein, or will be apparent to, those of ordinary skill in the art from the detailed description herein. Also, it should be further appreciated that modifications and variations to the specifically illustrated, referred and discussed features and steps hereof may be practiced in various embodiments and uses of the invention without departing from the spirit and scope of the subject matter. Variations may include, but are not limited to, substitution of equivalent means, features, or steps for those illustrated, referenced, or discussed, and the functional, operational, or positional reversal of various parts, features, steps, or the like.

Still further, it is to be understood that different embodiments, as well as different presently preferred embodiments, of the present subject matter may include various combinations or configurations of presently disclosed features, steps, or elements, or their equivalents (including combinations of features, parts, or steps or configurations thereof not expressly shown in the figures or stated in the detailed description of such figures). Additional embodiments of the present subject matter, not necessarily expressed in this summarized section, may include and incorporate various combinations of aspects of features, components, or steps referenced in the summarized objectives above, and/or other features, components, or steps as otherwise discussed in this application. Those of ordinary skill in the art will better appreciate the features and aspects of such embodiments, and others, upon review of the remainder of the specification.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

Figure 1:
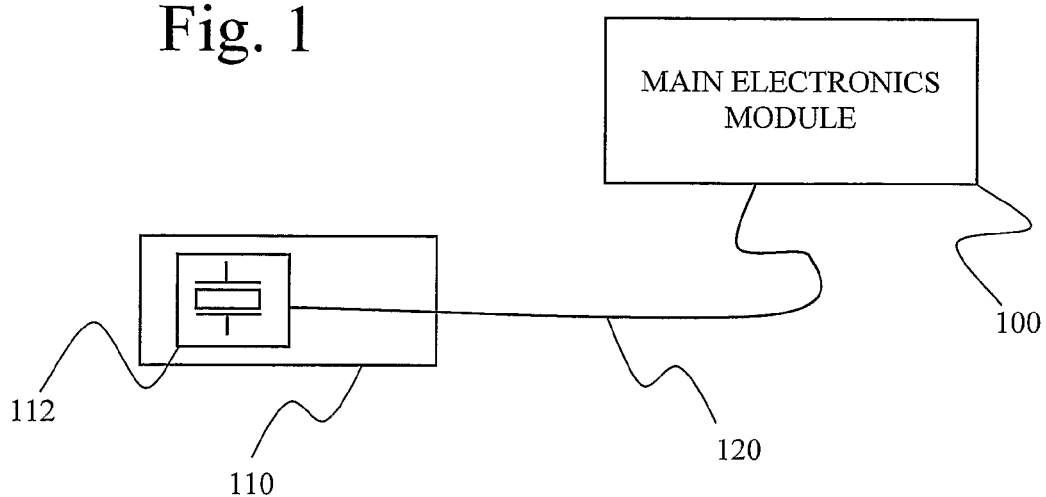
FIG. 1 illustrates a known arrangement for supplying signals from a piezoelectric device to integrated tire electronics.

Repeat use of reference characters throughout the present specification and appended drawings is intended to represent same or analogous features or elements of the invention.

DETAILED DESCRIPTION OF THE PREFERRED EMBODIMENTS

As discussed in the Summary of the Invention section, the present subject matter is particularly concerned with an improved system and methodology for transmitting tire rotation related signals to electronic systems integrated within a tire structure.

Selected combinations of aspects of the disclosed technology correspond to a plurality of different embodiments of the present invention. It should be noted that each of the exemplary embodiments presented and discussed herein should not insinuate limitations of the present subject matter. Features or steps illustrated or described as part of one embodiment may be used in combination with aspects of another embodiment to yield yet further embodiments. Additionally, certain features may be interchanged with similar devices or features not expressly mentioned which perform the same or similar function.

Reference will now be made in detail to the presently preferred embodiments of the subject inductive coupling apparatus and methodology in accordance with the present technology. Referring now to the drawings, FIG. 1 illustrates a known arrangement for coupling signals from a piezoelectric device to components of a tire electronics device that may be embedded in or associated with a pneumatic tire or wheel assembly.

As may be seen from FIG. 1, a main tire electronics module 100 may correspond to any number of different types of tire parameter monitoring devices and may be associated with a tire or wheel assembly in various ways, some of which have been discussed herein above. In like manner, a piezoelectric device 110 corresponding to at least a piezoelectric element 112 is associated with the main tire electronics module 100 and coupled thereto by way of one or more electrical conductors 120. Electrical conductors 120 may be configured to conduct tire rotation signals to selected of the electronics elements within tire electronics module 100 as well as other motion related or other electrical signals as may be generated by the piezoelectric element 112 for use by components and circuits within the tire electronics module 100.

In accordance with the present technology, it has been discovered that high speed vibrations and relative physical motion incident upon rotation of the tire or wheel assembly with which these components may be associated can have a negative impact upon the electrical connection provided by conductors 120. In addition, it has been found that it is difficult to effectively seal the various modules when there are one or more protruding wires.

Figure 2:
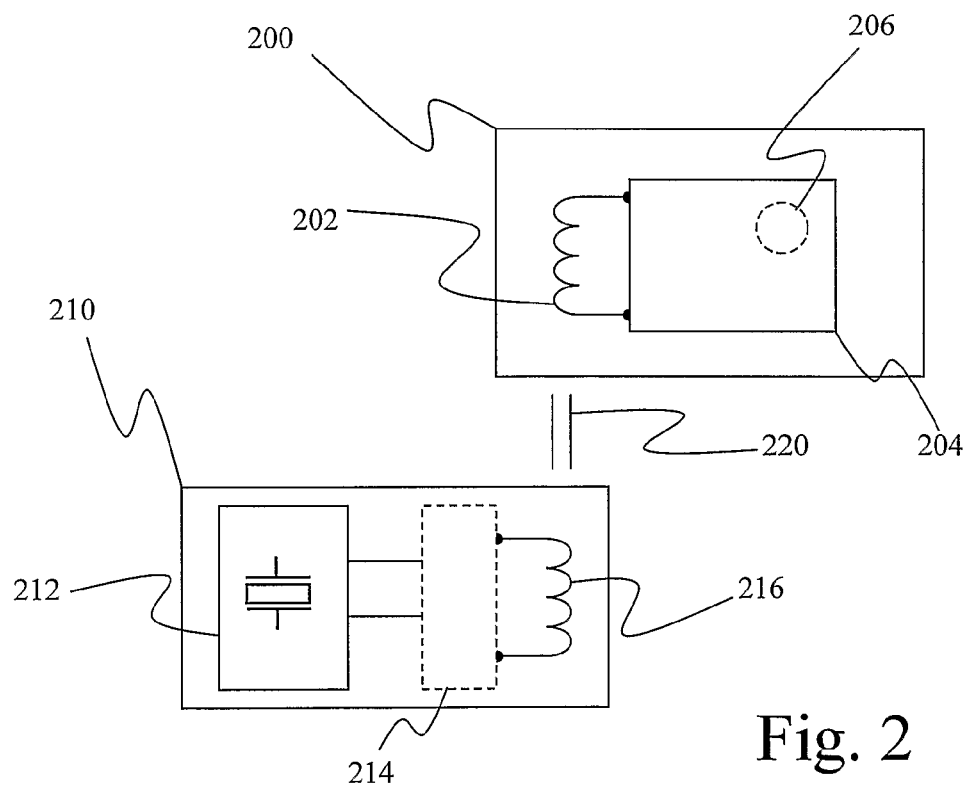
FIG. 2 illustrates inductive coupling from a piezoelectric signal source to an integrated tire electronics module in accordance with the present technology.

With reference now to FIG. 2, there is illustrated a schematic representation of an exemplary signal coupling arrangement in accordance with the present technology. As may be seen from FIG. 2, a main tire electronics module 200 that may be in all other respects substantially equivalent to main electronics module 100 is provided with a receiver inductor 202 that supplies tire rotation related signals to electronics package 204 within the tire electronics module 200. In like manner, a piezoelectric device 210 that in many respects is similar to piezoelectric device 110 is provided with a transmitter inductor 216 to couple tire rotation related signals from the piezoelectric device 210 by way of representatively illustrated flux field 220 to receiver inductor 202 within the main tire electronics module 200.

It should be noted that the exact nature of the main tire electronics module 200 is not limiting by the present technology except to the extent that the module requires externally supplied tire rotation related signals for its operation. Non limiting examples of functionality options that may be provided in main tire electronics module 200 either alone or in various combinations include temperature, pressure, number of revolutions, tire speed, speed/time at temperature, distance/time at speed, and distance/time at temperature as well as storage and retrieval of tire specific manufacturing data and the transmission and reception of all such data.

In certain exemplary embodiments of the present technology operating power for the tire electronics module 200 may also be supplied in whole or in part from the piezoelectric device 210. In one exemplary configuration, tire electronics module 200 may include a rechargeable battery 206 that may be recharged from energy harvested from the pulses produced by piezoelectric element 214. In another exemplary embodiment of the present technology, all of the operating power for the tire electronics module 200 may be supplied from energy harvested from the piezoelectric element 214.

As illustrated in FIG. 2, an exemplary embodiment of the piezoelectric device 210 in accordance with the present technology corresponds to a motion sensitive piezoelectric element 212 that is substantially equivalent to piezoelectric element 110 illustrated in FIG. 1. In addition, piezoelectric device 210 may include an optional conversion circuit 214 coupled to the output of motion sensitive piezoelectric element 212 for converting pulses from the motion sensitive piezoelectric element 212 to narrow width, i.e., high current, pulses for application to transmitter inductor 216. In another exemplary embodiment of the present technology, optional conversion circuit 214 may also include data encoding circuitry so that various types of information may be transmitted inductively to the tire electronics module 200 from the piezoelectric device 210.

In another exemplary embodiment of the present subject matter, the motion sensitive piezoelectric element 212 may be connected directly to the transmitter inductor 216 if the frequency content of the pulses produced by the motion sensitive piezoelectric element 212 is sufficiently high and the value of the inductor is sufficiently high. In many cases, a more cost effective coupling method would be to use smaller inductors and additional electronic circuitry to convert the energy pulses produced by the piezoelectric element 212 to narrow width, i.e., high energy, pulses by way of, for example, conversion circuit 214. This method of transmitting narrow width pulses would also provide a greater transmission range and increased noise immunity.

Piezoelectric device 210, whether provided with optional conversion circuit 214 or not, may be completely encased with a protective covering material. As the present technology provides for wireless transfer of tire rotation related signals to the tire electronics module 200, no physical access as by connecting external wiring is necessary. Thus the provision of a completely sealed piezoelectric device module is made possible. Additionally, as no external connecting wires are required for application of tire rotation related signals to the tire electronics module 200, such module may also be completely encased with a protective covering material. An alternative embodiment of the present technology includes the option of encasing the piezoelectric device 210 and tire electronics module 200 together in a common protective covering material.

Conversion circuit 214 may correspond to any available suitable pulse generating circuit capable of generating narrow width pulses from tire rotation related signals supplied by piezoelectric element 212 for application to an inductive load. An example of such a circuit that may be configured to operate with the present technology may be seen in co-pending U.S. patent application Ser. No. 10/880,197 filed Jun. 29, 2004, entitled "Power Conversion From Piezoelectric Sources" assigned to the assignee of the present application and incorporated herein for all purposes. Illustrated therein, among other things, are power conversion circuits in the form of buck converters that may be used to condition power from piezoelectric sources for use with other electronic devices and circuits. As is known in the art, classic buck converters generally include an output stage corresponding to a configuration wherein a capacitor may be charged by way of a series connected inductive element. The operation generally produces a pulsed charging of the capacitor. This type of pulse generation may be used to good advantage to energize inductive transmitter 216 of the present technology.

Figure 3:
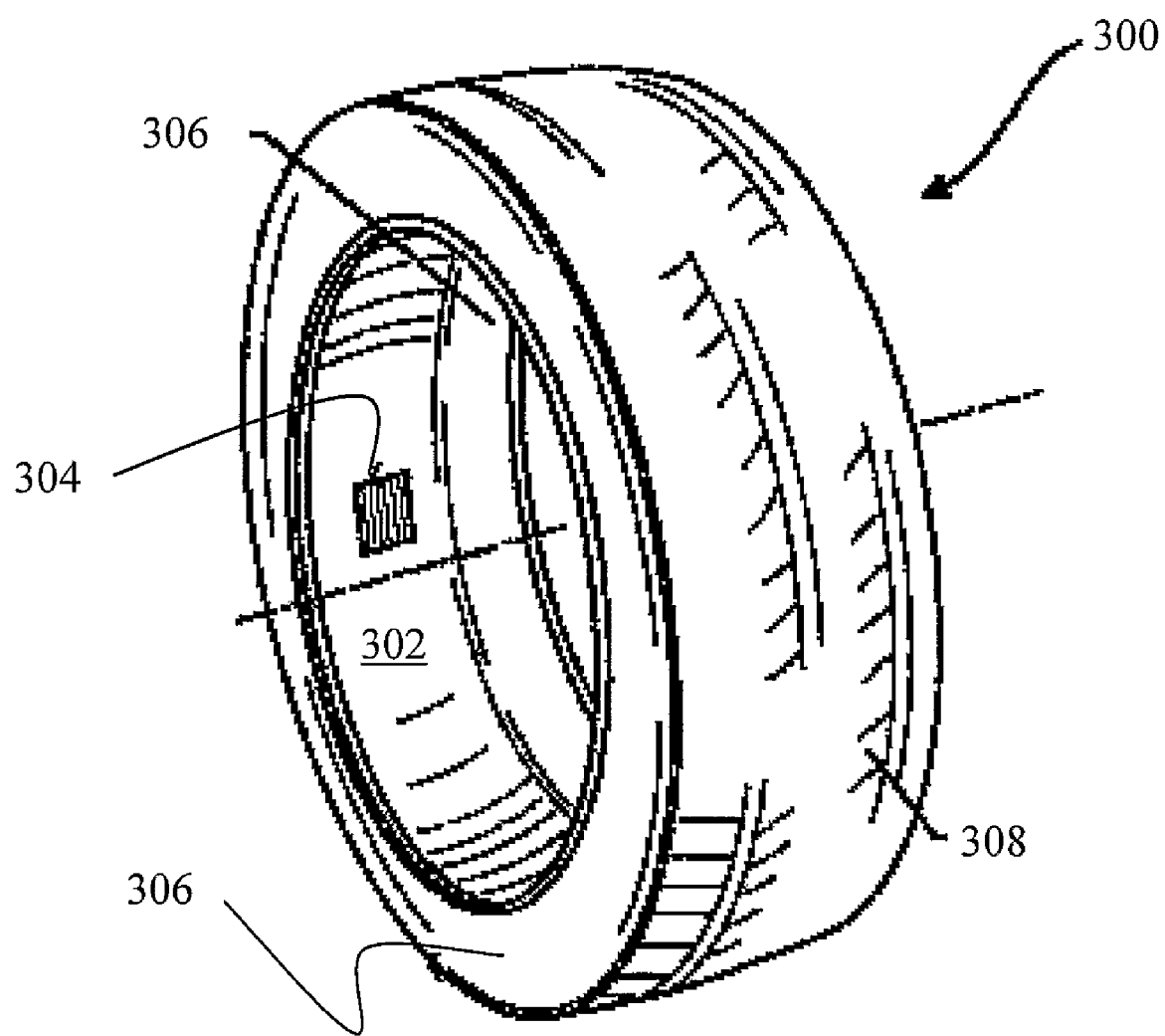
FIG. 3 generally illustrates the association of a piezoelectric device and integrated tire electronics modules with a tire structure in accordance with the present technology.

FIG. 3 depicts an exemplary perspective view of a pneumatic tire 300 characterized by a crown having an exterior tread portion 308, bead portions, and sidewall portions 306 extending between each tire bead and the crown. An inner liner 302 is provided along the interior crown and sidewall surfaces, to which a tire electronics module and/or piezoelectric device 304 may be mounted in accordance with the present subject matter. It should be borne in mind that the illustrated mounting arrangement of FIG. 3 is illustrative only in that the present technology anticipates associating tire electronics and/or piezoelectric device in a number of ways not only with a tire per se but also with an associated wheel assembly as has been discussed herein above.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A method for supplying signals to an electronics module, comprising the steps of:
   providing an electronics module;
   providing a motion sensitive piezoelectric element having output terminals;
   providing a transmitter inductor having input terminals;
   coupling the output terminals of the motion sensitive piezoelectric element to the input terminals of the transmitter inductor;
   positioning the transmitter inductor proximate the electronics module, and
   coupling a conversion circuit between the piezoelectric element and the transmitter inductor, wherein the conversion circuit is configured to convert pulses from the piezoelectric element into narrow width, high energy, pulses for application to the transmitter inductor;
   whereby signals may be supplied by inductive coupling to the electronics module from the motion sensitive piezoelectric element.

2. The method of claim 1, wherein the step of providing an electronics module comprises:
   providing a parameter sensitive electronics circuit;
   providing a receiver inductor; and
   coupling the receiver inductor to the parameter sensitive electronics circuit.

3. The method of claim 2, further comprising the step of encapsulating the parameter sensitive electronics circuit and receiver inductor in a protective covering.

4. The method of claim 1, further comprising the step of encapsulating the piezoelectric element and transmitter inductor in a protective covering.

5. The method of claim 1, further comprising the step of encapsulating the piezoelectric element, the conversion circuit and the transmitter inductor in a protective covering.

6. A tire electronics system, comprising:
   a tire electronics module including an electronics circuit coupled to a receiver inductor for signal transfer thereto; and
   a signal transmitter module including a piezoelectric element coupled to a transmitter inductor for signal transfer therefrom, the signal transmitter module comprising a conversion circuit between the piezoelectric element and the transmitter inductor, wherein the conversion circuit is configured to convert pulses from the piezoelectric element into narrow width, high energy, pulses for application to the transmitter inductor;
   wherein said tire electronics module and said signal transmitter module are positioned such that signals may be transferred inductively from the transmitter inductor of the signal transmitter module to the receiver inductor of the tire electronics module.

7. The tire electronics system of claim 6, wherein said signal transmitter module further includes a conversion circuit coupled between the piezoelectric element and the transmitter inductor,
   wherein the conversion circuit is configured to convert pulses from the piezoelectric element into narrow width, high energy pulses for application to the transmitter inductor.

8. The tire electronics system of claim 7, wherein said tire electronics module and said power supply signal transmitter module are separately encased in an elastomeric protective covering.

9. The tire electronics system of claim 7, wherein said tire electronics module and said signal transmitter module are encased together in an elastomeric protective covering.

10. The tire electronics system of claim 6, wherein the electronics circuit of the tire electronics module is a tire parameter sensitive electronic circuit.

11. The tire electronics system of claim 10, wherein the electronics circuit is configured to receive at least a portion of its operating power from the inductively transmitted signals.

12. A tire electronics system, comprising:
   a tire;
   a tire electronics module including an electronics circuit coupled to a receiver inductor for signal transfer thereto; and
   a signal transmitter module including a piezoelectric element coupled to a transmitter inductor for signal transfer therefrom,
   wherein said tire electronics module and said signal transmitter module are associated with said tire and positioned with respect to each other and said tire so that, upon rotation of said tire, signals may be produced by said piezoelectric element and transferred inductively from the transmitter inductor of the signal transmitter module to the receiver inductor of the tire electronics module;
   wherein the tire electronics module further includes a battery for supplying operating power to the electronics circuit within the tire electronics module and the electronics circuit is further configured to harvest energy from pulses generated by the piezoelectric element and received by the receiver inductor to recharge the battery.

13. The tire electronics system of claim 12, wherein said signal transmitter module further includes a conversion circuit coupled between the piezoelectric element and the transmitter inductor, wherein the conversion circuit is configured to convert pulses from the piezoelectric element into narrow width, high energy pulses for application to the transmitter inductor.

14. The tire electronics system of claim 13, wherein said tire electronics module and said signal transmitter module are separately encased in elastomeric protective coverings.

15. The tire electronics system of claim 13, wherein said tire electronics module and said signal transmitter module are encased together in an elastomeric protective covering.

16. The tire electronics system of claim 12, wherein the electronics circuit of the tire electronics module is a tire parameter sensitive electronic circuit.

17. The tire electronics system of claim 12, wherein the electronics circuit is further configured to harvest energy from pulses generated by the piezoelectric element and received by the receiver inductor.

* * * * *